(12) United States Patent
Fouquet et al.

(10) Patent No.: US 7,391,008 B2
(45) Date of Patent: Jun. 24, 2008

(54) METHOD AND SYSTEM FOR WAVELENGTH-DEPENDENT IMAGING AND DETECTION USING A HYBRID FILTER

(75) Inventors: Julie E. Fouquet, Portola Valley, CA (US); Rene P. Helbing, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/695,884

(22) Filed: Apr. 3, 2007

(65) Prior Publication Data

US 2007/0170352 A1  Jul. 26, 2007

Related U.S. Application Data

(63) Continuation of application No. 10/739,831, filed on Dec. 18, 2003, now Pat. No. 7,217,913.

(51) Int. Cl.
| | |
|---|---|
| *G01J 3/50* | (2006.01) |
| *H01L 27/00* | (2006.01) |
| *H01L 31/062* | (2006.01) |
| *H04N 3/14* | (2006.01) |
| *H04N 5/225* | (2006.01) |
| *H04N 1/46* | (2006.01) |
| *G02B 5/22* | (2006.01) |
| *G02F 1/33* | (2006.01) |
| *G01N 21/25* | (2006.01) |

(52) U.S. Cl. ............. 250/226; 250/208.1; 257/294; 348/273; 348/342; 358/512; 359/308; 359/891; 356/419

(58) Field of Classification Search ............ 250/226, 250/559.05, 559.02, 234, 225, 208.1, 214.1, 250/214 R; 356/443, 444, 414, 416, 419, 356/420; 348/99, 108, 270–274, 336, 342, 348/360; 358/512–515; 359/308–310, 359, 359/890, 891, 892; 257/294, 432, 440
See application file for complete search history.

(56) References Cited

U.S. PATENT DOCUMENTS

| 4,876,165 | A  |   | 10/1989 | Brewer et al. |
| 5,021,980 | A  | * | 6/1991  | Poenisch et al. ............ 702/134 |
| 5,258,618 | A  | * | 11/1993 | Noble ........................ 250/332 |
| 6,509,575 | B1 | * | 1/2003  | Nanni ................... 250/559.05 |
| 6,792,210 | B1 | * | 9/2004  | Hallock et al. ................ 398/83 |
| 2002/0113210 | A1 |   | 8/2002 | Treado et al. |

OTHER PUBLICATIONS

European Search Report Appln. No. 04814458.8-2217 dated Jul. 20, 2007.

* cited by examiner

*Primary Examiner*—Georgia Y. Epps
*Assistant Examiner*—Don Williams
(74) *Attorney, Agent, or Firm*—RatnerPrestia

(57) ABSTRACT

Apparatus and methods for wavelength-dependent detection are provided. A detector includes a hybrid filter having unpatterned and patterned filter layers and at least one light-detecting sensor that detects light in first and second wavelength bands from the patterned filter layer of the hybrid filter. The unpatterned filter layer passes light in two nonoverlapping wavelength bands relative to light in wavelength bands between or among the nonoverlapping wavelength bands. The patterned filter layer includes first and second regions configured respectively to pass light in the first and second wavelength bands of the nonoverlapping wavelength bands passed by the unpatterned filter layer.

24 Claims, 10 Drawing Sheets

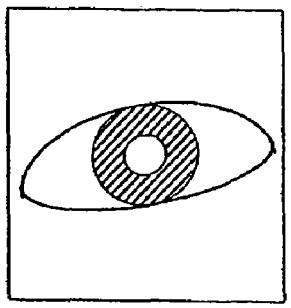 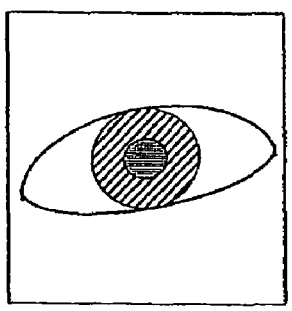 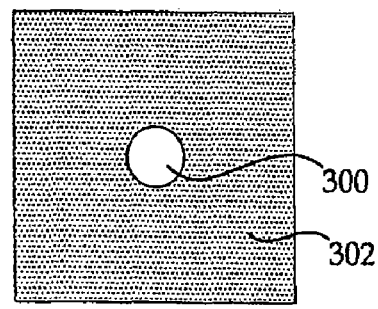
FIG. 3a     FIG. 3b     FIG. 3c
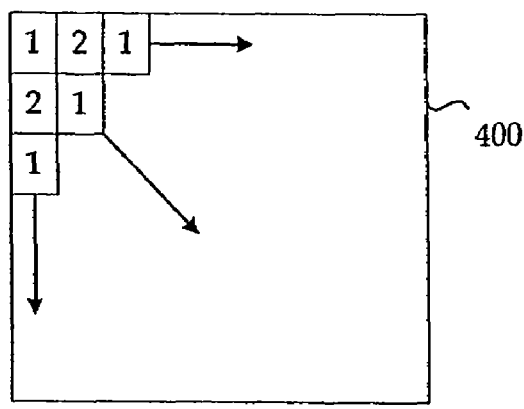
FIG. 4

METHOD AND SYSTEM FOR WAVELENGTH-DEPENDENT IMAGING AND DETECTION USING A HYBRID FILTER

This application is a Continuation of U.S. application Ser. No. 10/739,831, filed Dec. 18, 2003 now Pat. No. 7,217,91.

TECHNICAL FIELD

Embodiments in accordance with the invention relate generally to the field of imaging. More particularly, embodiments in accordance with the invention relate to methods and systems for wavelength-dependent imaging and detection using a hybrid filter.

BACKGROUND

There are a number of applications in which it is of interest to detect or image an object. Detecting an object determines the absence or presence of the object, while imaging results in a representation of the object. The object may be imaged or detected in daylight and/or in darkness, depending on the application.

Wavelength-dependent imaging is one technique for imaging or detecting an object, and typically involves detecting one or more particular wavelengths that reflect off, or transmit through, the object. In some applications, only solar or ambient illumination is required, while in other applications additional illumination is needed. Light is transmitted through the atmosphere at many different wavelengths, including visible and non-visible wavelengths. Thus, the wavelengths of interest may not be visible.

FIG. 1 is a diagram of the spectra of solar emission, a light-emitting diode, and a laser. As can be seen, the spectrum 100 of a laser is very narrow, while the spectrum 102 of a light-emitting diode (LED) is broader in comparison to the spectrum of the laser. And solar emission has a very broad spectrum 104 in comparison to both the LED and laser. The simultaneous presence of broad-spectrum solar radiation can make detecting light emitted from an eyesafe LED or laser and reflected off an object quite challenging during the day. Solar radiation can dominate the detection system and render the relatively weak scatter from the eyesafe light source small by comparison.

Additionally, the object being detected may not remain stationary during successive measurements. For example, if a human being is the object, the person may shift position or move during the time the measurements are taken. If measurements made at different wavelengths are made at different times, movement of the object during successive measurements can distort the measurements and render them useless.

SUMMARY

In accordance with the invention, a method and system for wavelength-dependent imaging and detection using a hybrid filter is provided. An object to be imaged or detected is illuminated by a single broadband light source or multiple light sources emitting light at different wavelengths. The light is detected by a detector, which includes a light-detecting sensor covered by a hybrid filter. The hybrid filter includes a multi-band narrowband filter mounted over a patterned filter layer. The light strikes the narrowband filter, which passes light at or near the multiple wavelengths of interest while blocking light at all other wavelengths. The patterned filter layer alternately passes the light at one particular wavelength while blocking light at the other wavelengths of interest. This allows the sensor to determine either simultaneously or alternately the intensity of the light at the wavelengths of interest. Filters may also be mounted over the light sources to narrow the spectra of the light sources.

BRIEF DESCRIPTION OF THE DRAWINGS

The invention will best be understood by reference to the following detailed description of embodiments in accordance with the invention when read in conjunction with the accompanying drawings, wherein:

FIG. 3a illustrates an image generated with an on-axis light source in accordance with the system shown in FIG. 2;

FIG. 3b depicts an image generated with an off-axis light source in accordance with the system shown in FIG. 2;

FIG. 3c illustrates an image resulting from the difference between the FIG. 3a image and the FIG. 3b image;

FIG. 4 depicts a sensor in one embodiment in accordance with the invention;

FIG. 7b depicts the spectrum for the dual spike filter shown in FIG. 7a;

FIG. 8b depicts the spectrum for the dual spike filter shown in FIG. 8a;

DETAILED DESCRIPTION

The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale.

Embodiments in accordance with the invention relate to methods and systems for wavelength-dependent imaging and detection using a hybrid filter. A technique for pupil detection is included in the detailed description as one such system that utilizes a hybrid filter in accordance with the invention. Hybrid filters in accordance with the invention, however, can be used in a variety of applications where wavelength-dependent detection and/or imaging of an object or scene is desired. For example, a hybrid filter in accordance with the invention may be used to detect movement along an earthquake fault, or to detect the presence, attentiveness, or location of a person or subject. Additionally, a hybrid filter in accordance with the invention may be used in biometric applications, such as, for example, systems that identify individuals using their eyes or facial features.

Figure 1:
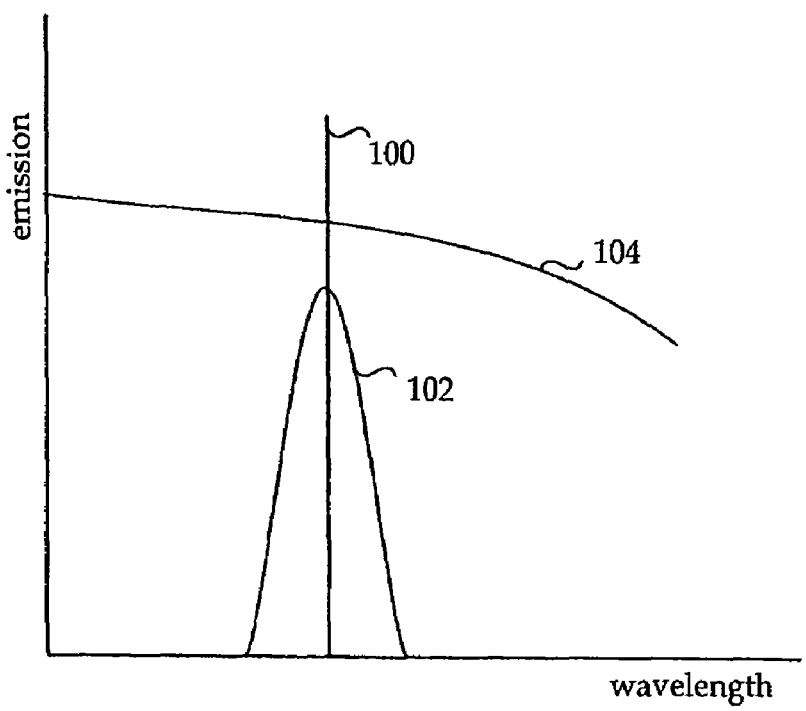
FIG. 1 is a diagram of the spectra for solar emission, a light-emitting diode, and a laser.
Figure 2:
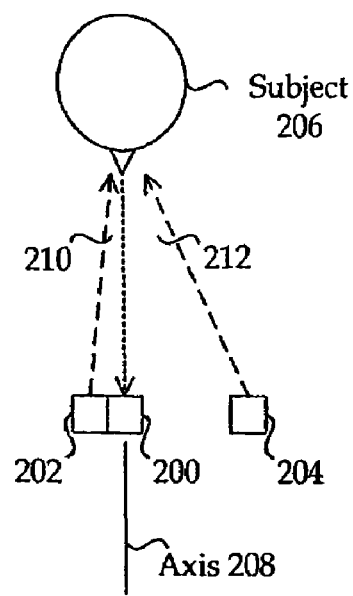
FIG. 2 is a diagram of a system for pupil detection that utilizes a hybrid filter in an embodiment in accordance with the invention.

With reference now to the figures and in particular with reference to FIG. 2, there is shown a diagram of a system for pupil detection that utilizes a hybrid filter in an embodiment in accordance with the invention. The system includes a detector 200 and two light sources 202, 204. The system may also optionally incorporate a controller or processor (not shown) in other embodiments in accordance with the invention.

Light sources 202, 204 are shown on opposite sides of detector 200 in the FIG. 2 embodiment. In other embodiments in accordance with the invention, light sources 202, 204, may be located on the same side of detector 200. Light sources 202, 204 may also be replaced by a single broadband light source emitting light at two or more different wavelengths in other embodiments in accordance with the invention. One example of such a broadband light source is the sun.

In this embodiment for pupil detection, two images are taken of a subject's 206 face and/or eyes using the detector 200. One of the images is taken using light source 202, which is close to or on the axis 208 of the detector 200 ("on-axis"). The second image is taken using light source 204 that is located at a larger angle away from the axis 208 of the detector 200 ("off-axis"). When the subject's 206 eyes are open, the difference between the images will highlight the pupils of the eyes. This is because the specular reflection from the retinas is detected only in the on-axis image. The diffuse reflections from other facial and environmental features are largely cancelled out, leaving the pupils as the dominant feature in the differential image. This can be used to infer the subject's 206 eyes are closed when the pupils are not detectable in the differential image.

The amount of time the subject's 206 eyes are open or closed can be monitored against a threshold in this embodiment in accordance with the invention. Should the threshold not be satisfied (e.g. the percentage of time the eyes are open fall below the threshold), an alarm or some other action can be taken to alert the subject 206. Other metrics, such as the frequency or duration of blinking, may be used in other embodiments in accordance with the invention.

Differential reflectivity off a retina of the subject 206 is dependent upon the angle 210 between light source 202 and the axis 208 of the detector 200, and the angle 212 between the light source 204 and the axis 208. In general, a smaller angle 210 will increase the retinal return. As used herein, "retinal return" refers to the intensity (brightness) that is reflected off the back of the subject's 206 eye and detected at detector 200. "Retinal return" is also used to include reflection off other tissue at the back of the eye (other than or in addition to the retina). Accordingly, angle 210 is selected such that light source 202 is on or close to axis 208. In this embodiment in accordance with the invention, angle 210 is in the range of approximately zero to two degrees.

In general, the size of angle 212 is chosen so that only low retinal return from light source 204 will be detected at detector 200. The iris (surrounding the pupil) blocks this signal, and so pupil size under different lighting conditions should be considered when selecting the size of angle 212. In this embodiment in accordance with the invention, angle 210 is in the range of approximately three to fifteen degrees. In other embodiments in accordance with the invention, the size of angles 210, 212 may be different. For example, the characteristics of a particular subject may determine the size of the angles 210, 212.

Light sources 202, 204 emit light that yields substantially equal image intensity (brightness) in this embodiment in accordance with the invention. Light sources 202, 204 emit light of different wavelengths in this embodiment in accordance with the invention. Even though light sources 202, 204 can be of any wavelength, the wavelengths are selected in this embodiment so that the light will not distract the subject and the iris of the eye will not contract in response to the light. The selected wavelengths should be in a range that allows the detector 200 to respond. In this embodiment in accordance with the invention, light sources 202, 204 are implemented as light-emitting diodes (LEDs) or multi-mode lasers having infrared or near-infrared wavelengths. Each light source 202, 204 may be implemented as one, or multiple, sources, where each such device is located at substantially the same angle from the axis 208.

FIG. 3a illustrates an image generated with an on-axis light source in accordance with the system shown in FIG. 2. The image shows an eye that is open. The eye has a bright pupil due to a strong retinal return created by the on-axis light source 202. If the eye had been closed, or nearly closed, the bright pupil would not be detected and imaged.

FIG. 3b depicts an image generated with an off-axis light source in accordance with the system shown in FIG. 2. The image in FIG. 3b may be taken at the same time as the image in FIG. 3a, or it may be taken in an alternate frame (successively or non-successively) to the image of FIG. 3a. The image of FIG. 3b illustrates a normal, dark pupil. If the eye had been closed or nearly closed, the normal pupil would not be detected and imaged.

FIG. 3c illustrates an image resulting from the difference between the FIG. 3a image and the FIG. 3b image. By taking the difference between the images of FIGS. 3a and 3b, a relatively bright spot 300 remains against the relatively dark background 302 when the eye is open. There may be vestiges of other features of the eye remaining in the background 302. However, in general, the bright spot 300 will stand out in comparison to the background 302. When the eye is closed or nearly closed, there will not be a bright spot 300 in the differential image.

FIGS. 3a-3c illustrate one eye of the subject 206. Those skilled in the art will appreciate that both eyes may be monitored as well. It will also be understood that a similar effect will be achieved if the images include other features of the subject 206 (e.g. other facial features), as well as features of the subject's 206 environment. These features will largely cancel out in a manner similar to that just described, leaving either a bright spot 300 when the eye is open (or two bright spots, one for each eye), or no spot(s) when the eye is closed or nearly closed.

Referring now to FIG. 4, there is shown a sensor in one embodiment in accordance with the invention. In this embodiment, a sensor 400 is incorporated into detector 200 (FIG. 2), and is configured as a complementary metal-oxide semiconductor (CMOS) imaging sensor. Sensor 400, however, may be implemented with other types of imaging devices in other embodiments in accordance with the invention, such as, for example, a charge-coupled device (CCD) imager.

A patterned filter layer is formed on sensor 400 using two different filters shaped into a checkerboard pattern. The two filters are determined by the wavelengths being used by light sources 202, 204. For example, in this embodiment in accordance with the invention, sensor 400 includes regions (identified as 1) that include a filter material for selecting the wavelength used by light source 202, while other regions (identified as 2) include a filter material for selecting the wavelength used by light source 204.

In the FIG. 4 embodiment, the patterned filter layer is deposited as a separate layer of sensor 400, such as, for example, on top of an underlying layer, using conventional deposition and photolithography processes while still in wafer form. In another embodiment in accordance with the invention, the patterned filter layer can be can be created as a separate element between sensor 400 and incident light. Additionally, the filter pattern can be configured in a pattern other than a checkerboard pattern. For example, the patterned filter layer can be formed into an interlaced striped or a non-symmetrical configuration (e.g. a 3-pixel by 2-pixel shape). The patterned filter layer may also be incorporated with other functions, such as color imagers.

Various types of filter materials can be used in the patterned filter layer. In this embodiment in accordance with the invention, the filter materials include polymers doped with pigments or dyes. In other embodiments in accordance with the invention, the filter materials may include interference filters, reflective filters, and absorbing filters made of semiconductors, other inorganic materials, or organic materials.

Figure 5:
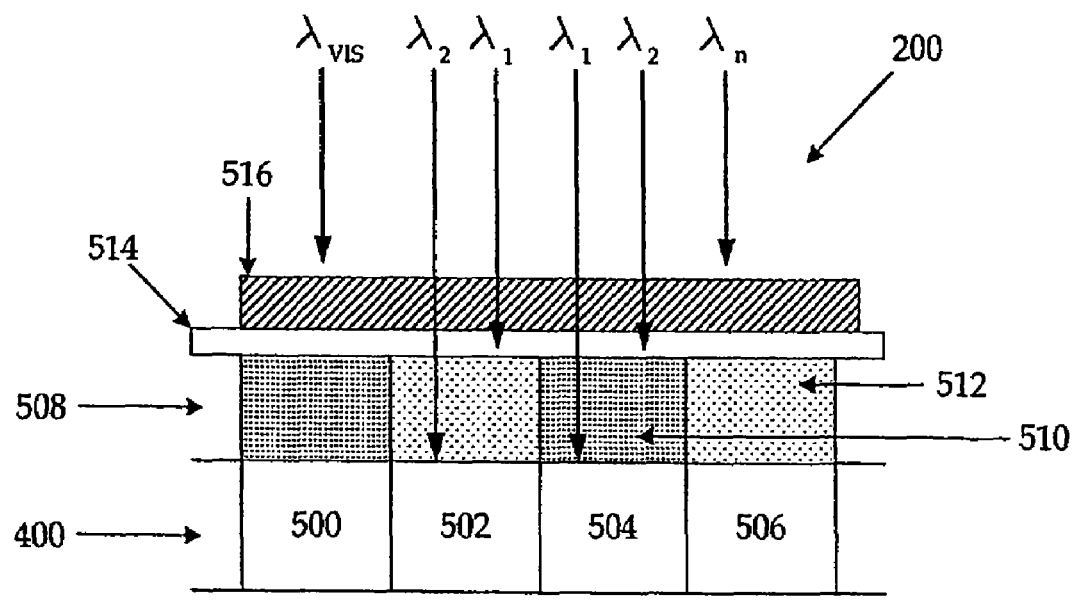
FIG. 5 is a cross-sectional diagram of a detector in accordance with one embodiment in accordance with the invention.

FIG. 5 is a cross-sectional diagram of a detector in accordance with one embodiment in accordance with the invention. Only a portion of the detector is shown in this figure. Detector 200 includes a sensor 400 comprised of pixels 500, 502, 504, 506, a patterned filter layer 508 including two alternating filter regions 510, 512, a glass cover 514, and a dual-band narrowband filter 516. Sensor 400 is configured as a CMOS imager and the patterned filter layer 508 as two polymers 510, 512 doped with pigments or dyes in this embodiment in accordance with the invention. Each region in the patterned filter layer 508 (e.g. a square in the checkerboard pattern) overlies a pixel in the CMOS imager.

When light strikes the upper surface of narrowband filter 516, the light at wavelengths other than the wavelengths of light source 202 ($\lambda_1$) and light source 204 ($\lambda_2$) are filtered out, or blocked, from passing through the narrowband filter 516. Thus, the light at visible wavelengths $\lambda_{VIS}$ and the light at wavelengths ($\lambda_n$) other than $\lambda_1$ and $\lambda_2$ are filtered out in this embodiment, while the light at or near the wavelengths $\lambda_1$ and $\lambda_2$ transmit through the narrowband filter 516. Thus, only light at or near the wavelengths $\lambda_1$ and $\lambda_2$ pass through glass cover 514. Thereafter, polymer 510 transmits the light at wavelength $\lambda_1$ while blocking the light at wavelength $\lambda_2$. Consequently, pixels 500 and 504 receive only the light at wavelength $\lambda_1$, thereby generating the image taken with the on-axis light source 202.

Polymer 512 transmits the light at wavelength $\lambda_2$ while blocking the light at wavelength $\lambda_1$, so that pixels 502 and 506 receive only the light at wavelength $\lambda_2$. In this manner, the image taken with the off-axis light source 204 is generated. The shorter wavelength $\lambda_1$ is associated with the on-axis light source 202, and the longer wavelength $\lambda_2$ with the off-axis light source 204, in this embodiment in accordance with the invention. The shorter wavelength $\lambda_1$, however, may be associated with the off-axis light source 204 and the longer wavelength $\lambda_2$ with the on-axis light source 202 in other embodiments in accordance with the invention.

Narrowband filter 516 is a thin-film bulk dielectric stack filter in this embodiment in accordance with the invention. Dielectric stack filters are designed to have particular spectral properties. In this embodiment in accordance with the invention, the dielectric stack filter is formed as a dual spike filter. The narrowband filter 516 (i.e., dielectric stack filter) is designed to have one peak at $\lambda_1$ and another peak at $\lambda_2$.

Figure 6:
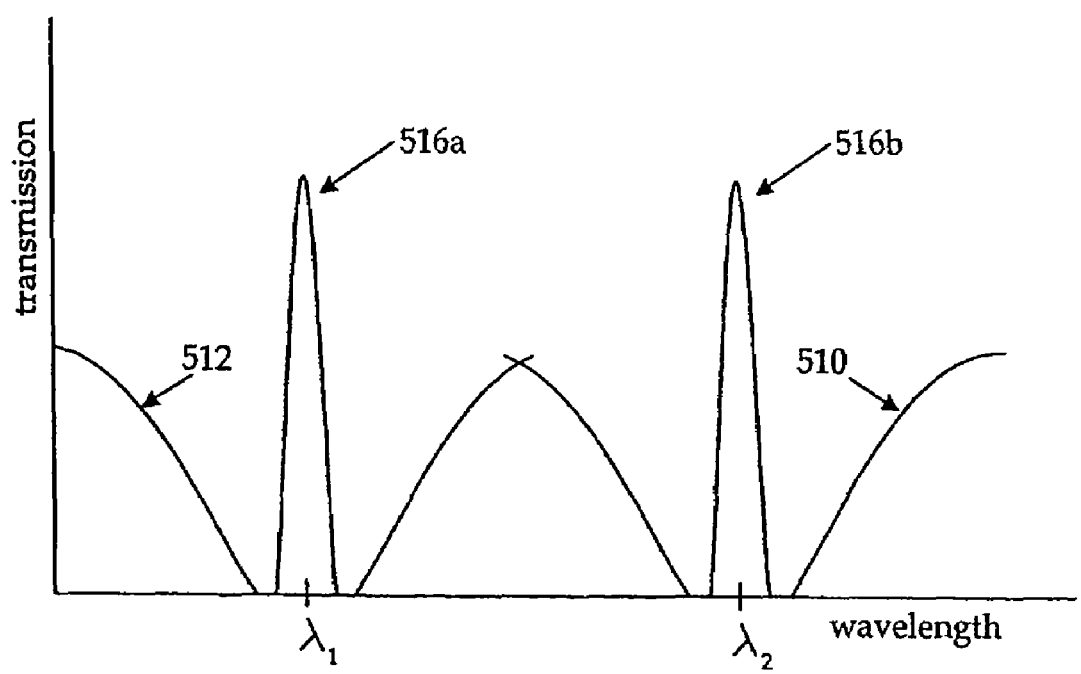
FIG. 6 depicts spectra for the polymer filters and the narrowband filter shown in FIG. 5.

The narrowband filter 516 and the patterned filter layer 508 form a hybrid filter in this embodiment in accordance with the invention. FIG. 6 depicts spectra for the polymer filters and the narrowband filter shown in FIG. 5. As shown in FIG. 6, the hybrid filter (combination of the polymer filters 510, 512 and the narrowband filter 516) effectively filters out all light except for the light at or near the wavelengths of the light sources ($\lambda_1$ and $\lambda_2$). The narrowband filter 516 transmits a narrow amount of light at or near the wavelengths of interest, $\lambda_1$ and $\lambda_2$, while blocking the transmission of light at other wavelengths. Therefore, only the light at or near wavelengths $\lambda_1$ and $\lambda_2$ strike polymer filters 510, 512 in the patterned filter layer 508. The patterned filter layer 508 is then used to discriminate between $\lambda_1$ and $\lambda_2$. Wavelength $\lambda_1$ is transmitted through filter 510 (and not through filter 512), while wavelength $\lambda_2$ is transmitted through filter 512 (and not through filter 510).

Those skilled in the art will appreciate the patterned filter layer 508 provides a mechanism for selecting channels at pixel spatial resolution. In this embodiment in accordance with the invention, channel one is associated with the on-axis image and channel two with the off-axis image. In other embodiments in accordance with the invention, channel one may be associated with the off-axis image and channel two with the on-axis image.

Sensor 400 sits in a carrier (not shown) in this embodiment in accordance with the invention. The glass cover 514 typically protects the sensor 400 from damage and particle contamination (e.g. dust). In another embodiment in accordance with the invention, the hybrid filter includes the patterned filter layer 508, the glass cover 514, and the narrowband filter 516. The glass cover 514 in this embodiment is formed as a colored glass filter, and is included as the substrate of the dielectric stack filter (i.e., the narrowband filter 516). The colored glass filter is designed to have certain spectral properties, and is doped with pigments or dyes. Schott Optical Glass Inc., a company located in Mainz, Germany, is one company that manufactures colored glass that can be used in colored glass filters.

Figure 7A:
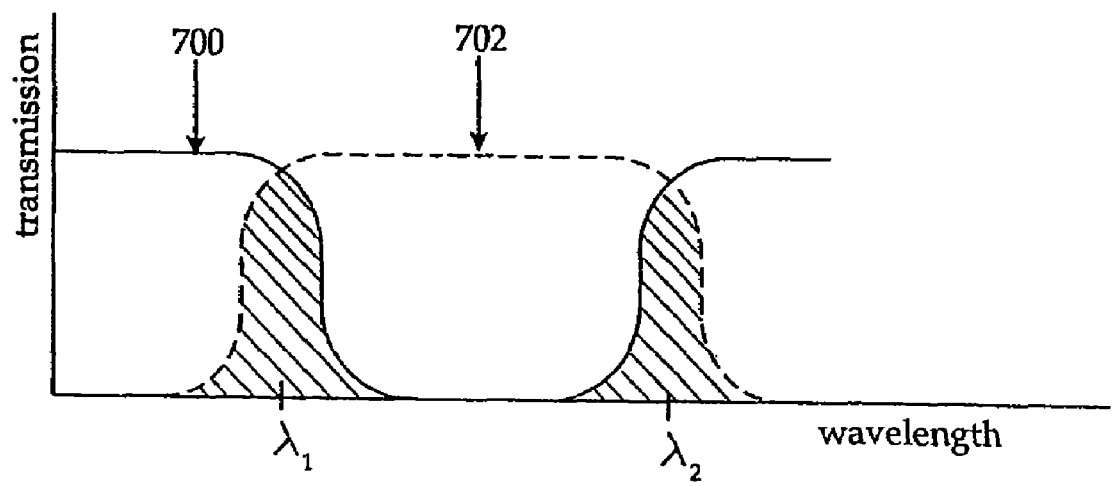
FIG. 7a illustrates a first method for fabricating a dual spike filter in an embodiment in accordance with the invention.

Referring now to FIG. 7a, there is shown a first method for fabricating a dual spike filter in an embodiment in accordance with the invention. As discussed in conjunction with the FIG. 5 embodiment, the narrowband filter 516 is a dielectric stack filter that is formed as a dual spike filter. Dielectric stack filters can include any combination of filter types. The desired spectral properties of the completed dielectric stack filter determine which types of filters are included in the layers of the stack.

Figure 7B:
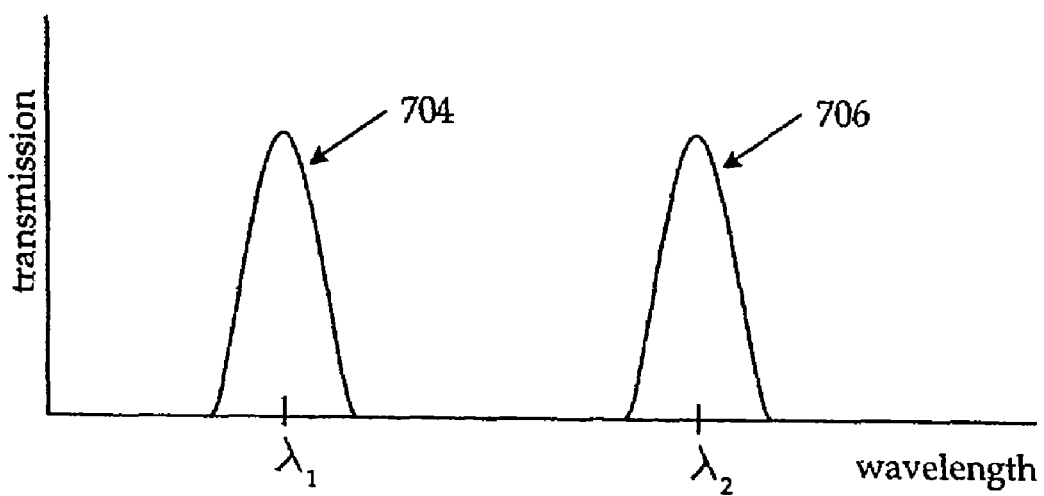

For example, a dual-spike filter can be fabricated by combining two filters 700, 702. A band-blocking filter 700 filters out the light at wavelengths between the regions around wavelengths $\lambda_1$ and $\lambda_2$, while a bandpass filter 702 transmits light near and between wavelengths $\lambda_1$ and $\lambda_2$. The combination of the two filters 700, 702 transmits light in the hatched areas, while blocking light at all other wavelengths. FIG. 7b depicts the spectrum for the dual spike filter shown in FIG. 7a. As can be seen, light transmits through the combined filters only at or near the wavelengths of interest, $\lambda_1$ (peak 704) and $\lambda_2$ (peak 706).

Figure 8A:
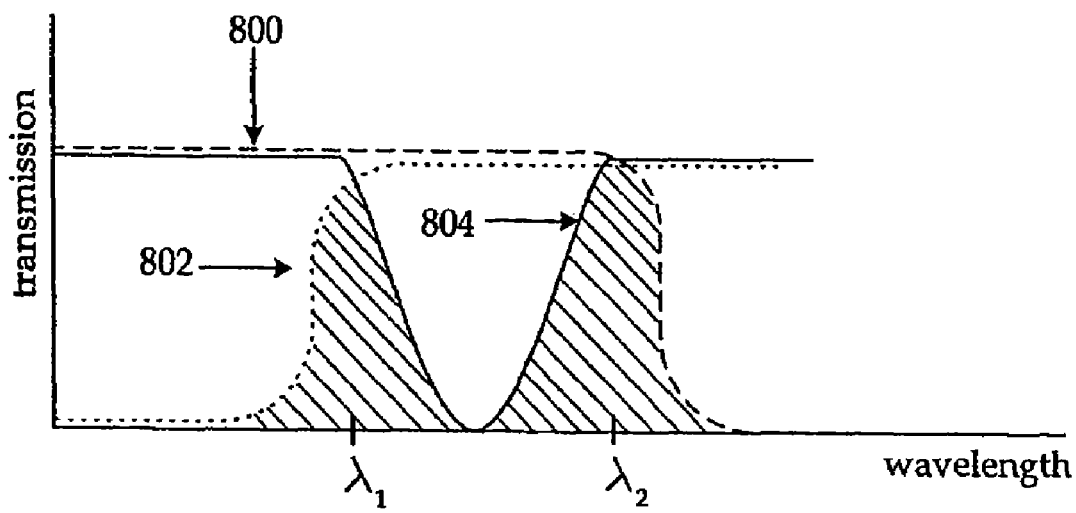
FIG. 8a illustrates a second method for fabricating a dual spike filter in an embodiment in accordance with the invention.
Figure 8B:
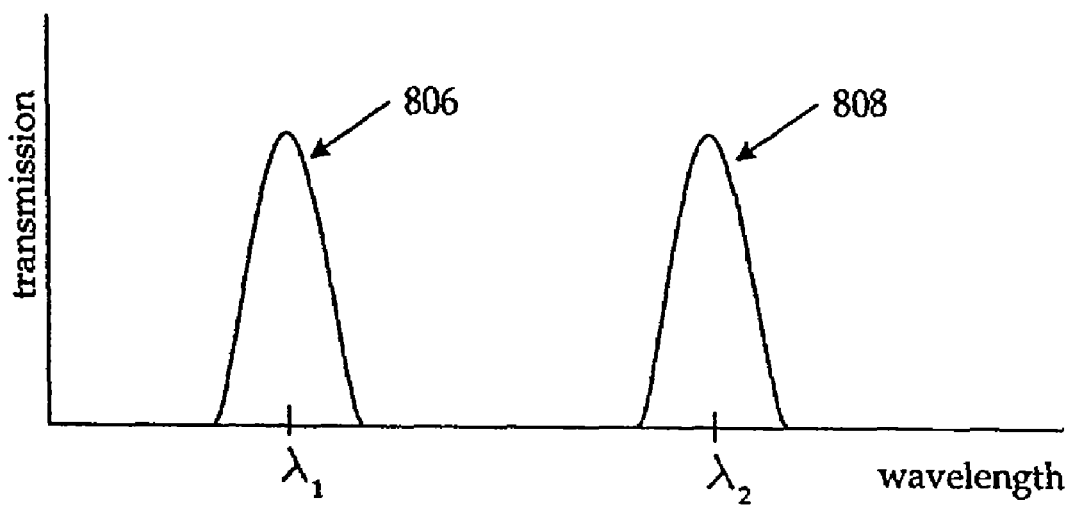

Referring now to FIG. 8a, there is shown a second method for fabricating a dual spike filter in an embodiment in accordance with the invention. A dual-spike filter can be fabricated in this embodiment by combining a cut-off filter 800, a cut-on filter 802, and a band-blocking filter 804. The combination of the three filters transmits light in the hatched areas, while blocking light at all other wavelengths. FIG. 8b depicts the spectrum for the dual spike filter shown in FIG. 8a. As can be seen, light transmits through the combined filters only at or near the wavelengths of interest, $\lambda_1$ (peak 806) and $\lambda_2$ (peak 808).

In some applications, such as in pupil detection, it is more desirable to use LEDs rather than lasers as light sources. LEDs are typically safer to use in eye detection compared with lasers. LEDs also have lower coherence than lasers, which eliminates speckle. Additionally, more of the object is illuminated by LEDs because LEDs have broader divergence. And finally, LEDs are usually less expensive than lasers.

Figure 9:
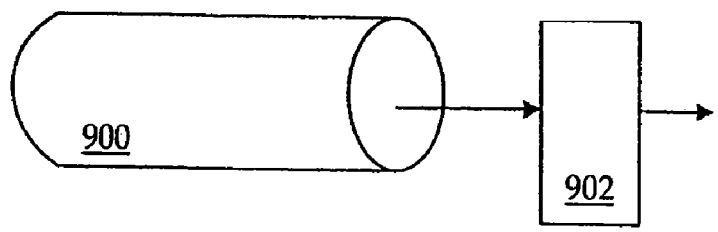
FIG. 9 is a diagram of a light source and a narrowband filter in an embodiment in accordance with the invention.

A narrowband light source can be created with an LED by placing a narrowband filter in front of, or on top of, the LED light source to narrow the spectrum of the LED. FIG. 9 is a diagram of a light source and a narrowband filter in an embodiment in accordance with the invention. Light source 900 is a light-emitting diode (LED) and narrowband filter 902 is a single spike dielectric stack filter in the FIG. 9 embodiment. In other embodiments in accordance with the invention, however, narrowband filter 902 may be configured as other types of filters. Furthermore, the dielectric stack filter may be fabricated as, or including, a colored glass filter. And other light sources, such as white light sources, may be used in other embodiments in accordance with the invention.

Figure 10:
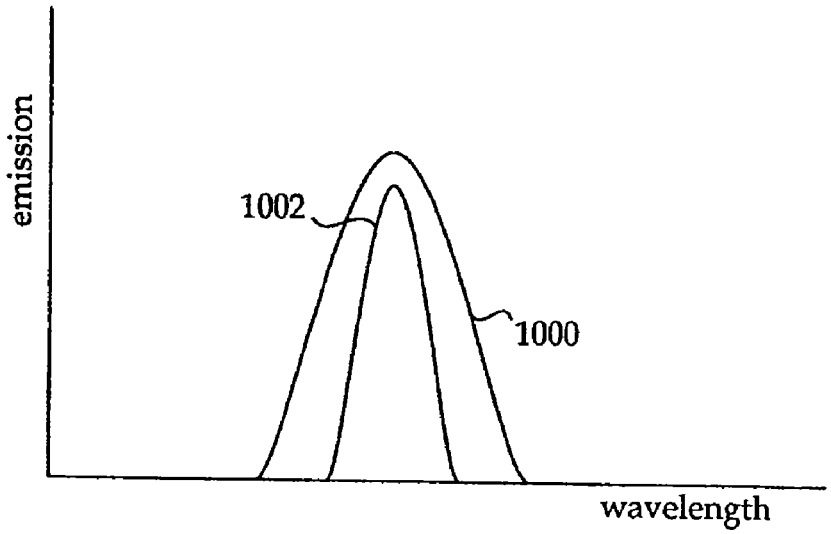
FIG. 10 illustrates the spectra of the light source and the combination of the light source and the narrowband filter, shown in FIG. 9.

Referring now to FIG. 10, there is shown an illustration of the spectra of the light source and the combination of the light source and the narrowband filter, as shown in FIG. 9. As can be seen, the spectrum (1000) of the light source 900 by itself is broader than the spectrum (1002) of the combination of the light source 900 and the narrowband filter 902. As discussed earlier, a narrowband light source can be constructed with a broader spectrum light source 900 by forming or placing a narrowband filter 902 on top of, or in front of, the broader spectrum light source.

Figure 11:
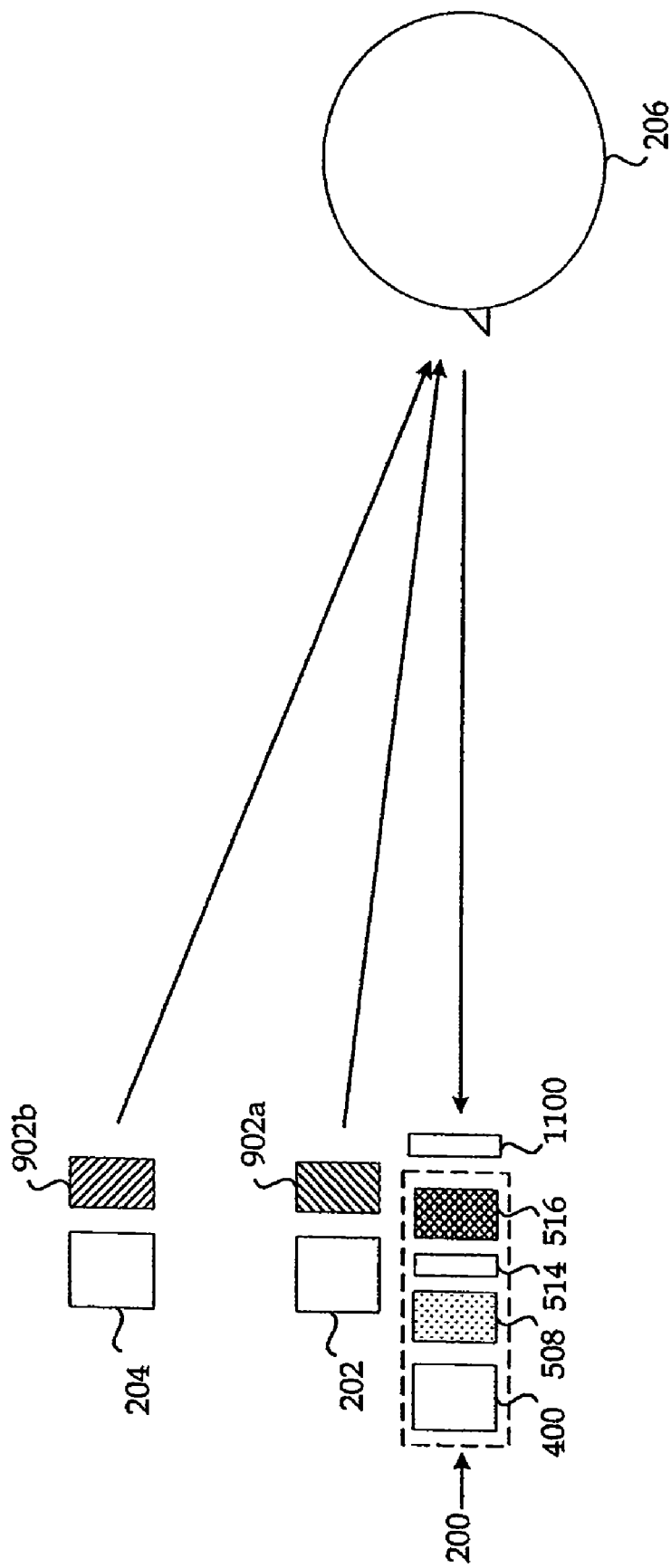
FIG. 11 is a diagram of a second system for pupil detection that utilizes a narrowband filter with each light source and a hybrid filter with a sensor in an embodiment in accordance with the invention.

FIG. 11 is a diagram of a second system for pupil detection that utilizes a narrowband filter with each light source and a hybrid filter with a sensor in an embodiment in accordance with the invention. Similar reference numbers have been used for those elements that function as described in conjunction with earlier figures. A detector 200 includes a sensor 400, a patterned filter layer 508, a glass cover 514, and a narrowband filter 516. A lens 1100 captures the light reflected off subject 206 and focuses it onto the top surface of the narrowband filter 516 in detector 200.

The light source 202 includes a narrowband filter 902a, while the light source 204 includes a narrowband filter 902b. Narrowband filters 902a, 902b have been fabricated to create filters having appropriate spectral properties for the light sources 202, 204, respectively. As discussed earlier, the narrowband filters 902a, 902b allow the system to utilize light sources that have broader spectra but may be safer and less expensive to use than narrower spectrum light sources. In other embodiments in accordance with the invention, different types of filters may be used with light sources 202, 204. Examples of different filter types include, but are not limited to, cut-on filters and cut-off filters.

The on-axis image is captured by detector 200 using light source 202, and the off-axis image is captured by detector 200 using light source 204. The hybrid filter includes the patterned filter layer 508 and the narrowband filter 516 in this embodiment in accordance with the invention. The hybrid filter blocks out light at all wavelengths other than the wavelengths of the light sources 202, 204. Therefore, sensor 400 detects only the light at the wavelengths of the light sources 202, 204.

Figure 12:
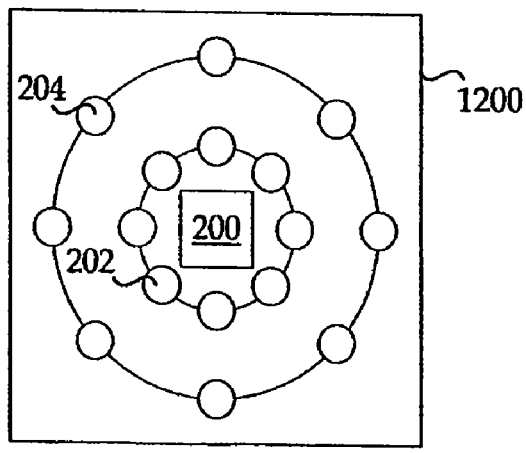
FIG. 12 is a diagram of a device that can be used for pupil detection in one embodiment in accordance with the invention.

Referring now to FIG. 12, there is shown a diagram of a device that can be used for pupil detection in one embodiment in accordance with the invention. Device 1200 includes the detector 200, a number of on-axis light sources 202, and a number of off-axis light sources 204. Each on-axis light source 202 is located at substantially the same angle from the axis of the detector 200 in this embodiment in accordance with the invention. Similarly, each off-axis light source 204 is located at substantially the same angle from the axis of the detector 200.

The on-axis image is captured by detector 200 using light sources 202, and the off-axis image is captured by detector 200 using light sources 204. The light sources 202, 204 are shown as being housed in the same device 1200 as the detector 200 in this embodiment in accordance with the invention. In other embodiments in accordance with the invention, light sources 204 may be located in a housing separate from light sources 202 and detector 200. Furthermore, light sources 202 may be located in a housing separate from detector 200 by placing a beam splitter between the detector and the object.

Figure 13:
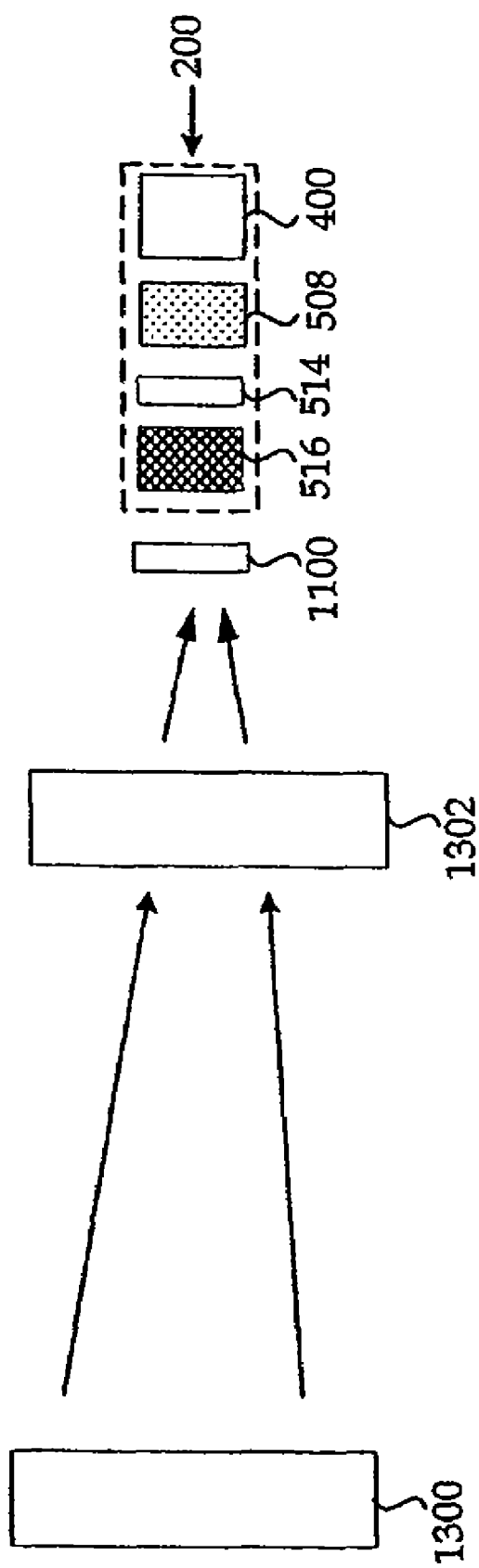
FIG. 13 is a diagram of a system for detecting transmission through an object that utilizes a hybrid filter in another embodiment in accordance with the invention.

FIG. 13 is a diagram of a system for detecting transmission through an object that utilizes a hybrid filter in another embodiment in accordance with the invention. Similar reference numbers have been used for those elements that function as described in conjunction with earlier figures. A detector 200 includes a sensor 400, a patterned filter layer 508, a glass cover 514, and a narrowband filter 516.

A broadband light source 1300 transmits light toward a transparent object 1302. The broadband light source 1300 emits light at multiple wavelengths, two of which will be detected by detector 200. In other embodiments in accordance with the invention, the broadband light source 1300 may be replaced by two light sources transmitting light at different wavelengths.

A lens 1100 captures the light transmitted through the transparent object 1300 and focuses it onto the top surface of the narrowband filter 516. One image is captured by detector 200 using light that is transmitted at one wavelength, while a second image is captured by detector 200 using light that is transmitted at the other wavelength.

The hybrid filter includes the patterned filter layer 508 and the narrowband filter 516 in this embodiment in accordance with the invention. The hybrid filter blocks out light at all wavelengths other than the two wavelengths of interest, allowing the sensor 400 to detect only the light at the two wavelengths.

Figure 14:
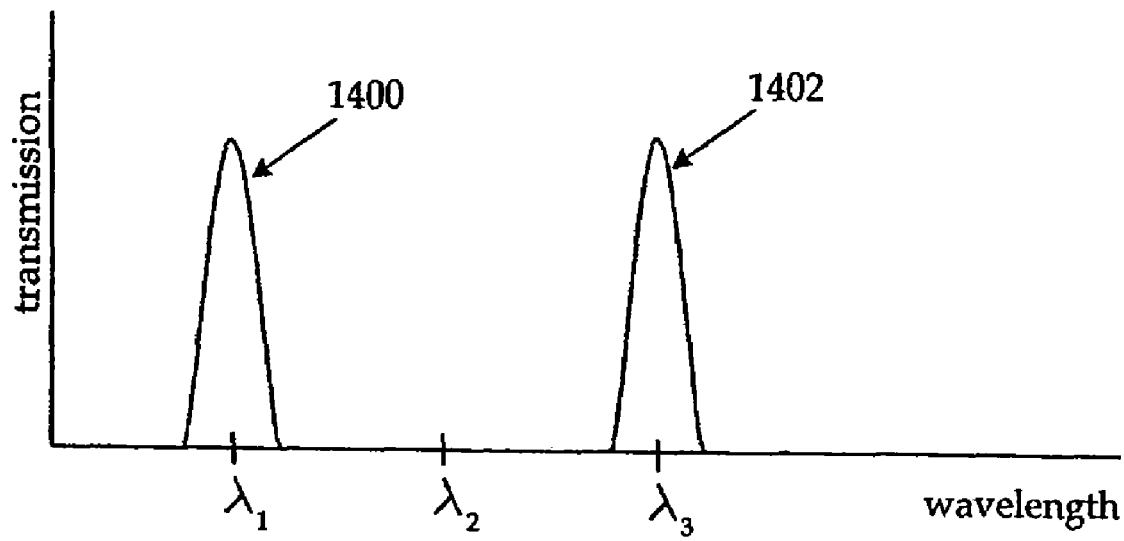
FIG. 14 depicts spectra for polymer filters and a tri-band narrowband filter in an embodiment in accordance with the invention.

Although a hybrid filter has been described with reference to detecting light at two wavelengths, $\lambda_1$ and $\lambda_2$, hybrid filters in other embodiments in accordance with the invention may be used to detect more than two wavelengths of interest. FIG. 14 depicts spectra for polymer filters and a tri-band narrowband filter in an embodiment in accordance with the invention. A hybrid filter in this embodiment detects light at three wavelengths of interest, $\lambda_1$, $\lambda_2$, and $\lambda_3$. The spectra 1400 and 1402 at wavelengths $\lambda_1$ and $\lambda_3$, respectively, represent two signals to be utilized by an imaging system. Light detected at wavelength $\lambda_2$ is used to determine the amount of light received by the imaging system outside the two wavelengths of interest. The amount of light detected at wavelength $\lambda_2$ may be used as a reference amount of light detectable by the imaging system.

Figure 15:
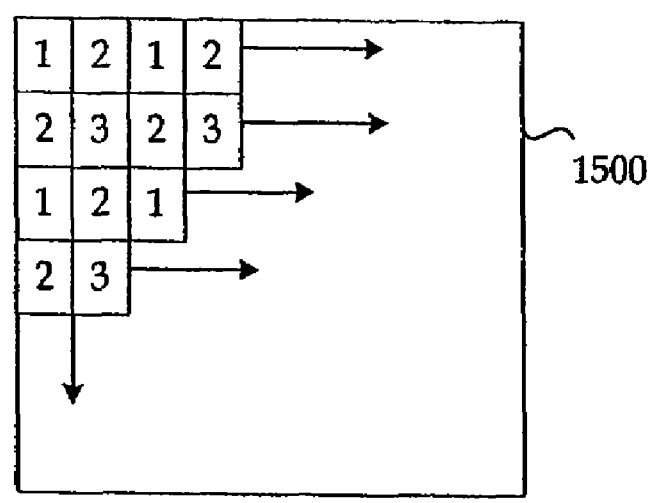
FIG. 15 depicts a sensor in accordance with the embodiment shown in FIG. 14.

A tri-band narrowband filter transmits light at or near the wavelengths of interest ($\lambda_1$, $\lambda_2$, and $\lambda_3$) while blocking the transmission of light at all other wavelengths in this embodiment in accordance with the invention. Polymer filters in a patterned filter layer then discriminate between the light received at wavelengths $\lambda_1$, $\lambda_2$, and $\lambda_3$. FIG. 15 depicts a sensor in accordance with the embodiment shown in FIG. 14. A patterned filter layer is formed on sensor 1500 using three different filters. For example, in one embodiment in accordance with the invention, sensor 1500 may include a red-green-blue color three-band filter pattern. Red corresponds to regions 1, green to regions 2, and blue to regions 3 in the figure. There are twice as many greens as other colors in this embodiment because human perception of brightness depends most strongly on the green range.

Figure 16:
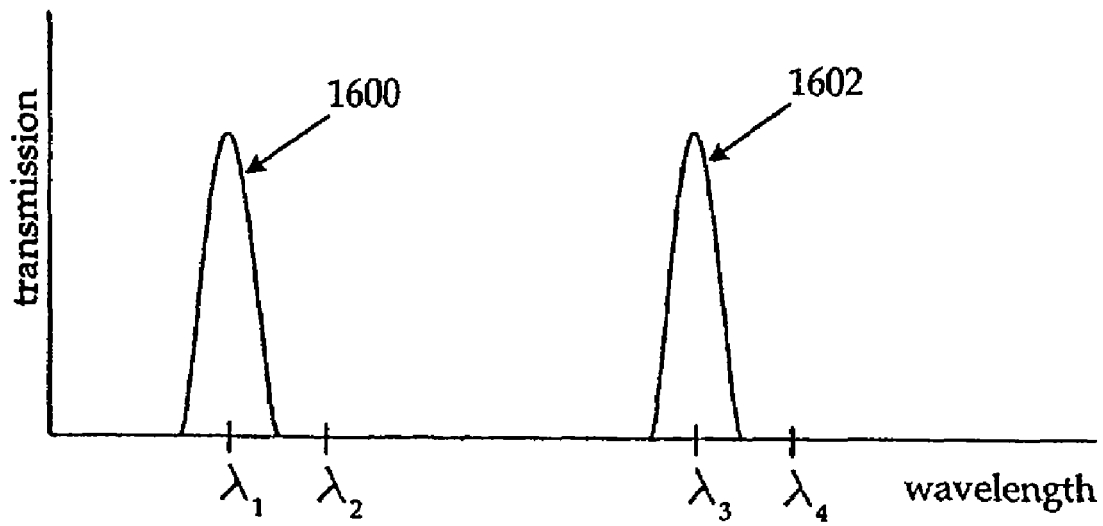
FIG. 16 depicts spectra for polymer filters and a quad-band narrowband filter in an embodiment in accordance with the invention.

Referring now to FIG. 16, there is shown spectra for polymer filters and a quad-band narrowband filter in an embodiment in accordance with the invention. A hybrid filter in this embodiment detects light at four wavelengths of interest, $\lambda_1$, $\lambda_2$, $\lambda_3$, and $\lambda_4$. The spectra 1600, 1602 at wavelengths $\lambda_1$ and $\lambda_3$, respectively, represent two signals to be utilized by an imaging system. Light detected at wavelengths $\lambda_2$ and $\lambda_4$ is used as a reference to determine the amount of light received by the imaging system outside the two wavelengths of interest.

Figure 17:
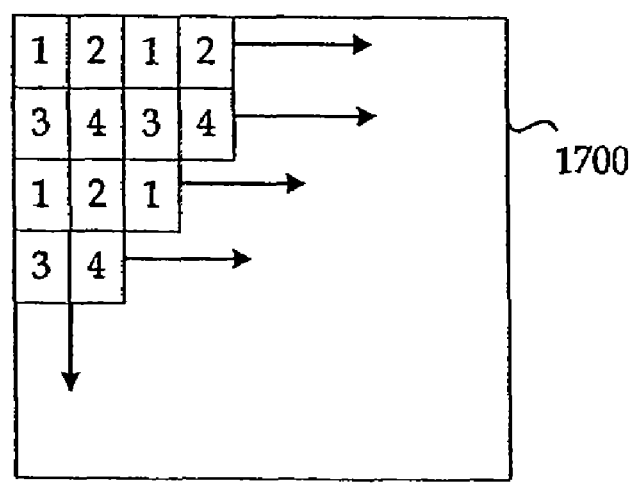
FIG. 17 depicts a sensor in accordance with the embodiment shown in FIG. 16.

A quad-band narrowband filter transmits light at or near the wavelengths of interest ($\lambda_1$, $\lambda_2$, $\lambda_3$, and $\lambda_4$) while blocking the transmission of light at all other wavelengths in this embodiment in accordance with the invention. Polymer filters in a patterned filter layer then discriminate between the light received at wavelengths $\lambda_1$, $\lambda_2$, $\lambda_3$, and $\lambda_4$. FIG. 17 depicts a sensor in accordance with the embodiment shown in FIG. 16. A patterned filter layer is formed on sensor 1700 using four different filters. For example, in this embodiment in accordance with the invention, sensor 1700 includes rows of filters 1 and 2 alternating with rows of filters 3 and 4. Filters 1 and 2 detect the light at wavelengths $\lambda_1$ and $\lambda_2$, while filters 3 and 4 detect the light at wavelengths $\lambda_3$ and $\lambda_4$.

Hybrid filters in other embodiments in accordance with the invention may detect any number of wavelengths of interest. For example, an n-band narrowband filter would transmit light at or near the wavelengths of interest. Regions within a patterned filter layer would alternately block at least one (and up to (n-1)) of the wavelengths of interest. For systems that utilize a patterned filter layer having regions that transmit two or more wavelengths of interest, mathematical computations, such as linear algebra, may be performed in order to determine the amount of light received at each wavelength of interest.

What is claimed:

1. A detector, comprising:
  a filter comprising:
  an unpatterned filter configured to pass light in at least two nonoverlapping wavelength bands and to impede passage of light in wavelength bands between or among the at least two nonoverlapping wavelength bands, and
  a patterned filter below the unpatterned filter that includes at least first and second regions configured respectively to pass light in at least first and second wavelength bands of the at least two nonoverlapping wavelength bands passed by the unpatterned filter; and
  at least one light-detecting sensor configured to receive light from the filter for detecting an amount of light received in the at least first and second wavelength bands.

2. The detector according to claim 1, wherein:
  the at least two nonoverlapping wavelength bands include at least three nonoverlapping wavelengths bands, the at least two regions include at least three regions configured respectively to pass light in at least three wavelength bands of the at least three nonoverlapping wavelength bands, the at least one light-detecting sensor detects an amount of light received in the at least three wavelength bands, and
  the amount of light detected in at least one of the at least three wavelength bands provides a reference amount of light.

3. The detector according to claim 1, wherein the patterned filter comprises one of patterned dye-doped polymers, patterned pigment-doped polymers, patterned interference filters, patterned reflective filters, or patterned absorbing filters.

4. The detector according to claim 1, wherein the at least first and second regions of the patterned filter are formed in one of a checkerboard configuration, an interlaced striped configuration or a rectangular checkerboard configuration.

5. The detector according to claim 1, wherein the unpatterned filter comprises a dielectric stack filter.

6. The detector according to claim 5, wherein the dielectric stack filter further comprises a colored glass filter.

7. The detector according to claim 5, wherein the dielectric stack filter includes at least two filters arranged to pass light in the at least two nonoverlapping wavelengths bands.

8. The detector according to claim 7, wherein the at least two filters include a band-blocking filter to substantially block light in the wavelength bands between the at least two nonoverlapping wavelength bands and a bandpass filter to substantially pass light at least in the at least two nonoverlapping wavelength bands.

9. The detector according to claim 7, wherein the at least two filters include a band-blocking filter to substantially block light in the wavelength bands between the at least two nonoverlapping wavelength bands and cut-off and cut-on filters configured to substantially pass light at least in the at least two nonoverlapping wavelength bands.

10. An imaging system comprising:
  a source configured to emit light including at least two wavelengths towards an object;
  a filter comprising:
  an unpatterned filter configured to pass light in at least two nonoverlapping wavelength bands and to impede passage of light in wavelength bands between or among the at least two nonoverlapping wavelength bands, and
  a patterned filter below the unpatterned filter that includes at least first and second regions configured respectively to pass light in at least first and second wavelength bands of the at least two nonoverlapping wavelength bands passed by the unpatterned filter; and at least one light-detecting sensor configured to receive light from the filter for detecting an amount of light received in the at least first and second wavelength bands, wherein the at least two wavelengths correspond to the at least two nonoverlapping wavelength bands and the unpatterned filter of the detector is configured to receive light from the source that is reflected from the object or transmitted through the object.

11. The imaging system according to claim 10, further comprising:
a processor for determining the amount of detected light in the at least first and second wavelength bands from the at least one light-detecting sensor; and
a controller for controlling at least one of the processor, the source or the detector.

12. The imaging system according to claim 10, further comprising a lens for receiving light from the object and focusing the received light onto the at least one light-detecting sensor through the unpatterned filter and the patterned filter.

13. The imaging system according to claim 10, further comprising a filter overlying the source to narrow an emission spectrum of the source.

14. The imaging system according to claim 10, wherein the source includes a light emitting diode (LED) or a multi-mode laser.

15. The imaging system according to claim 10, wherein the source includes a first source and a second source, the at least two wavelengths include a first wavelength and a second wavelength,
the first source is configured to emit light toward an object at the first wavelength,
the second source is configured to emit light toward the object at the second wavelength, and
the first source and the second source are positioned at respective first second angles relative to an axis of the detector to provide light substantially on-axis and light substantially off-axis, respectively.

16. The imaging system according to claim 15, wherein the first source includes a plurality of first sources and the second source includes a plurality of second sources and each of the plurality of first sources and the plurality of second sources are arranged in a circular configuration relative to the axis of the detector at the respective first and second angles.

17. A method for wavelength-dependent detection, comprising:
receiving light from an object, the light having at least two wavelengths in respective wavelength bands of at least two nonoverlapping wavelength bands;
selectively passing the received light in the at least two nonoverlapping wavelength bands and impeding passage of light in wavelength bands between the at least two nonoverlapping wavelength bands through an unpatterned filter;
further passing the selectively passed light through at least two regions of a patterned filter to pass light in the respective wavelength bands of the at least two nonoverlapping wavelength bands, light in the respective wavelength bands passed by different regions of the at least two regions; and
detecting an amount of light received in the respective wavelength bands from the further passed light.

18. The method of claim 17, wherein the step of detecting the amount of light comprises simultaneously detecting the amount of light received in the respective wavelength bands.

19. The method of claim 17, wherein the step of detecting the amount of light comprises sequentially detecting the amount of light received in the respective wavelength bands.

20. The method of claim 17, the method further comprising:
transmitting light at a first wavelength of the at least two wavelengths towards the object from a first source at a first angle relative to the object to provide light substantially on-axis; and
transmitting light at a second wavelength of the at least two wavelengths towards the object from a second source at a second angle relative to the object to provide light substantially off-axis.

21. A filter comprising:
an unpatterned filter configured to pass light in two nonoverlapping wavelength bands and to impede passage of light in a wavelength band between the two nonoverlapping wavelength bands; and
a patterned filter below the unpatterned filter that includes first and second regions configured respectively to pass light in first and second wavelength bands of the two nonoverlapping wavelength bands passed by the unpatterned filter.

22. The filter according to claim 21, wherein the unpatterned filter includes two filters arranged to pass light in the two nonoverlapping wavelengths bands.

23. The detector according to claim 22, wherein the two filters include a band-blocking filter to substantially block light in the wavelength band between the two nonoverlapping wavelength bands and a bandpass filter to substantially pass light at least in the two nonoverlapping wavelength bands.

24. The detector according to claim 22, wherein the two filters include a band-blocking filter to substantially block light in the wavelength band between the two nonoverlapping wavelength bands and cut-off and cut-on filters configured to substantially pass light at least in the two nonoverlapping wavelength bands.

* * * * *

UNITED STATES PATENT AND TRADEMARK OFFICE
CERTIFICATE OF CORRECTION

| | | |
|---|---|---|
| PATENT NO. | : 7,391,008 B2 | Page 1 of 1 |
| APPLICATION NO. | : 11/695884 | |
| DATED | : June 24, 2008 | |
| INVENTOR(S) | : Fouquet et al. | |

It is certified that error appears in the above-identified patent and that said Letters Patent is hereby corrected as shown below:

In column 1, line 6, delete "7,217,91." and insert -- 7,217,913. --, therefor.

Signed and Sealed this

Twenty-third Day of September, 2008

JON W. DUDAS
*Director of the United States Patent and Trademark Office*